United States Patent [19]

Takahashi et al.

[11] Patent Number: 5,117,246
[45] Date of Patent: May 26, 1992

[54] CAMERA SYSTEM HAVING AN IMAGE BLUR PREVENTION FEATURE

[75] Inventors: Kohji Takahashi, Yokohama; Shigeru Ogino, Tokyo; Kazuhiro Noguchi, Kawasaki; Takashi Kobayashi, Mitaka, all of Japan

[73] Assignee: Canon Kabushiki Kaisha, Tokyo, Japan

[21] Appl. No.: 708,199

[22] Filed: May 31, 1991

[30] Foreign Application Priority Data

May 31, 1990 [JP] Japan .................................. 2-141953

[51] Int. Cl.⁵ ...................... G03B 15/00; G03B 17/00
[52] U.S. Cl. ..................................... 354/202; 354/430; 354/286
[58] Field of Search ................. 354/430, 195.1, 195.12, 354/202, 286

[56] References Cited

U.S. PATENT DOCUMENTS 2,829,557  4/1958  Jensen .
2,959,088  11/1960  Rantsch .
4,780,739  10/1988  Kawakami et al. ............... 354/430
4,965,619  10/1990  Shikaumi et al. ............... 354/430 X Primary Examiner—Michael L. Gellner
Attorney, Agent, or Firm—Fitzpatrick, Cella, Harper & Scinto

[57] ABSTRACT

A camera system having an image blur correcting function includes: a lens unit with a correcting optical system for correcting blur of images, a position sensor for detecting a moving position of the correcting optical system, a restricting unit for generating a driving force of restricting a displacement of the correcting optical system on the basis of an output of the position sensor, a fixing unit for temporarily fixing the correcting optical system, and a lens side communication circuit for exchanging data with a camera body; and a camera body including a camera side communication circuit for exchanging data with the lens side communication circuit, and an operation control circuit for outputting to the camera side communication circuit an operation control signal which controls the operation of the restriction unit and that of the fixing unit in accordance with the operation mode of the camera.

13 Claims, 15 Drawing Sheets (LOCKED STATE)

(UNLOCKED STATE)

CAMERA SYSTEM HAVING AN IMAGE BLUR PREVENTION FEATURE

BACKGROUND OF THE INVENTION

1. Field of the Invention

The present invention relates to a camera system having an image blur prevention function for preventing an image blur caused by camera shake or the like.

2. Description of the Related Art

Optical apparatus for preventing an image blur caused by camera shake or the like are known.

U.S. Pat. Nos. 2,959,088 and 2,829,557, for example, disclose a device for preventing image blur by utilizing the inertia of a movably disposed correcting optical system.

FIG. 1 shows the configuration of the aforementioned type of image blur preventing device. In FIG. 1, in addition to main lenses 12 and 13 fixed to a lens barrel (hereinafter referred to simply as a barrel) 4 for forming an image on a focal plane (not shown), lenses 1 and 2 are provided to form a correcting optical system for correcting image blur. The focal length of the correcting optical system is set such that it satisfies the following relation $$f1 = f2$$

where f1 is the focal length of the lens 1 fixed to the barrel 4 and has a negative refractive power, and f2 is the focal length of the lens 2 supported on a movable supporting member 3 and has a positive refractive power.

The movable supporting member 3 is supported on the barrel 4 by a gimbal 5 so that it can pivot freely about two axes at a position separated from the image principal point of the lens 2 by the focal length f2 ($= -f1$).

FIG. 2 shows the structure of the gimbal 5. The movable supporting member 3 for holding the lens 2 is supported by a vertical supporting member 5y which can pivot freely about the y axis, the vertical supporting member 5y is supported by a horizontal supporting member 5x which can pivot freely about the x axis, perpendicular to the y axis, and the horizontal supporting member 5x is supported by the barrel 4. In this way, the correcting optical system can pivot freely about two axes.

In the structure shown in FIG. 1, a counterweight 10, which balances the lens 2 relative to the gimbal 5, is mounted on the movable supporting member 3 on the side of the gimbal 5 which is remote from the lens 2.

An inertia pendulum type stabilizer optical system is thus arranged. This stabilizer optical system, which is shown in FIG. 1, prevents an image blur in a manner described below.

Assuming that the structure shown in FIG. 1 comprises a telescope, an optical image of an object is formed on a focal plane 14 within the barrel 4 directed at the object. In the case of a hand-held telescope having a high magnification, the barrel 4 is vibrated at a frequency ranging from 0.1 to 10 Hz due to a phenomenon known as "telescope shake" and this generates an image blur.

However, according to the optical mechanism which is shown in FIG. 1, when such vibrations occur, relative displacement occurs between the lenses 2 and 1 due to inertia of the movable supporting member 3, and image blur is thereby suppressed.

In FIG. 1, a damping member 9 made of a non-magnetic, electronically conductive material, such as aluminum, is mounted on the movable supporting member 3. The damping member 9 generates a damping force in accordance with the speed at which the barrel 4 is vibrated because of the magnetic effect formed by magnets 6 and 7 fixed to the barrel 4. This damping force prevents collision of the movable supporting member 3 against the inner wall of the barrel 4, which would occur when the barrel 4 is rapidly displaced in order to change, for example, the composition of an object being viewed.

Specifically, as shown in the enlarged view of FIG. 3, an eddy current, generated in the electronically conductive damping member 9 due to the presence of the magnets 6 and 7, produces a damping force in a direction corresponding to the displacement of the movable supporting member 3 from the center of the movement, on which the optical axis of the lens 2 coincides with the optical axes of the main lenses 12 and 13, i.e., a main optical axis 15.

In FIG. 3, the magnets 6 and 7 are shown only on the upper portion of the barrel 4. However, this is merely for convenience of description, and similar magnets are provided on the lower portion and on the right and left portions of the barrel 4 to achieve biaxial control.

Also, a magnetic member 11, formed integrally with the counterweight 10, is mounted on the movable supporting member 3. A magnetic field formed by both the magnetic member 11 and a magnet 8 fixed to the barrel 4, which is shown in FIG. 1, is utilized for centering the movable supporting member 3 on the center of movement on which the optical axis of the lens 2 coincides with the main optical axis 15. When no image blur is present, it is preferable from the standpoint of the optical characteristics that the centering operation be conducted using the central portion of the lens 2. Therefore, manufacturing errors or direct current components of the eddy current are eliminated, and the optical axis of the lens 2 is made to coincide with the main optical axis 15.

Specifically, the magnetic member 11 and the magnet 8 are disposed such that the same magnetic poles, e.g., the north poles thereof, face each other, and are hence arranged such that they magnetically repel each other, as shown in FIG. 3. At that time, since the center of the magnet 8 coincides with the main optical axis 15, a centering force is generated such that the optical axis of the lens 2 coincides with the main optical axis 15.

Thus, the above-described damping and centering structures do not hinder improvement in the characteristics of the inertia pendulum type image blur preventing device.

In recent years, single-lens reflex cameras have generally been used together with any of various types of interchangeable lenses, ranging from a wide angle lens to a telephoto lens. A photographer makes a selection of these interchangeable lenses in accordance with his or her photographic intentions. Also, video cameras of the type which permit a change of lenses have been researched. When the aforementioned image blur preventing device is incorporated on an interchangeable lens mounted on such cameras, image blur, caused by camera shake or the like, may be eliminated.

However, the above-described image blur preventing device has the following drawbacks. During certain photographic operations, panning the camera, i.e., moving the barrel 4 in a horizontal direction in order to change the horizontal composition of the image being viewed or tilting the camera, i.e., moving the barrel 4 in a vertical direction in order to change the vertical composition of the image being viewed is often conducted in order to track or change an object being viewed. However, the above-described image blur preventing device is capable of preventing only vibrations caused by camera shake or the like. Therefore, when a panning or tilting operation is actually conducted by moving the camera continuously in one direction, the image blur preventing effect may be reduced, or the correcting optical system moved in one direction may remain at that position or collide against an inner wall of the barrel 4, thus producing an image blur.

Therefore, mere incorporation of the aforementioned image blur preventing device on an interchangeable lens raises the foregoing problems.

SUMMARY OF THE INVENTION

A primary object of the present invention is to provide a camera system which permits efficient image blur prevention, and which is capable of preventing collision of a movable supporting member against the inner wall of a lens barrel which would occur when an image blur preventing operation is not conducted.

A second object of the present invention is to provide a camera system having an image blur preventing function which is capable of improving the characteristics of image blur prevention, which is capable of preventing blurred images caused by panning or tilting, and which is capable of preventing breakage of an optical correcting means which would occur when an image blur prevention operation is not conducted.

A third object of the present invention is to provide an image blur correcting device suitable for use in an interchangeable lens type camera system.

A fourth object of the present invention is to provide an interchangeable lens type camera system which is capable of attaining an image blur correcting characteristic regardless of the focal length of a lens mounted on the camera.

A fifth object of the present invention is to provide a camera system having an image blur correcting feature in which the operation of a fixing means for fixing the optical correcting means on a lens side and that of a restriction means for restricting the displacement of the optical correction means are controlled through communications made between the camera and the lens so as to achieve improvement in the characteristics pertaining to image blur prevention with an interchangeable lens having any focal length, so as to achieve prevention of blurred images caused by panning or tilting, and so as to prevent breakage of the optical correction means which would occur when an image blur preventing operation is not conducted.

In order to achieve the aforementioned objects, the present invention provides in one preferred embodiment a camera system having an image blur correcting function which comprises a lens unit including an optical correction means for correcting image blur, a position sensor for detecting a position of the optical correction means, a restriction means for generating a driving force for restricting a displacement of the optical correction means on the basis of an output of the position sensor, a fixing means for temporarily fixing the optical correction means, and a lens side communication means for exchanging data with a camera body; and a camera body including a camera side communication means for exchanging data with the lens side communication means, and an operation control means for outputting to the camera side communication means an operation control signal of controlling the operation of the restriction means and that of the fixing means in accordance with an operation mode of the camera.

A sixth object of the present invention is to provide an interchangeable lens system suitable for use in an interchangeable lens type camera system which allows correction of the displacement of and fixing control of an image blur correction means to be made in accordance with the control information transmitted from the camera side.

To achieve yet another of the foregoing objects, the present invention provides in another preferred embodiment a lens unit comprising a correcting optical system for correcting an image blur, a position sensor for detecting a position of the correcting optical system, a restriction means for generating a driving force of restricting a displacement of the correcting optical system on the basis of an output of the position sensor, a fixing means for temporarily fixing the correcting optical system, a communication means for exchanging data with a camera body, and a control means for controlling the restriction means and the fixing means on the basis of the data received from the camera by the communication means.

To achieve yet another of the foregoing objects, the present invention provides in another preferred embodiment an interchangeable lens which comprises a correcting optical system for correcting blur of images, a position sensor for detecting a position of the optical correction means, a restriction means for generating a driving force which restricts a displacement of the optical correction means on the basis of an output of the position sensor, a fixing means for temporarily fixing the optical correction means, and a lens side communication means for exchanging data with a camera body and a control means for outputting a control signal for controlling the restriction means and the fixing means on the basis of data, received from the camera by the communication means.

Other objects and advantages of the invention will become apparent during the following discussion of the accompanying drawings.

DETAILED DESCRIPTION OF THE PREFERRED EMBODIMENTS

Preferred embodiments of the present invention will now be described with reference to the accompanying drawings.

Figure 4:
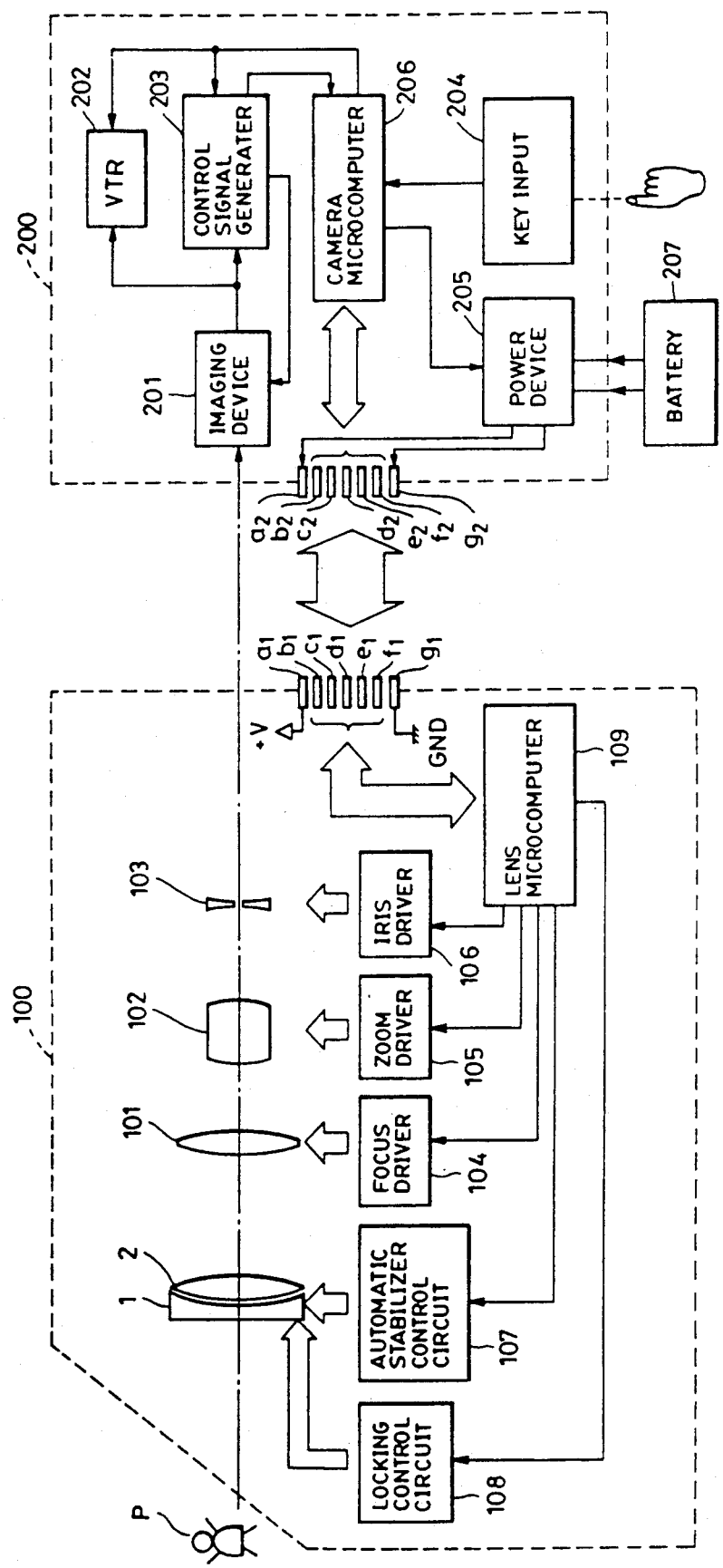
FIG. 4 is a block diagram of a video camera showing an embodiment of the present invention.

FIG. 4 is a block diagram of a video camera system having an image blur preventing device mounted on an interchangeable lens, showing an embodiment of the present invention. In this interchangeable lens type camera system, an interchangeable lens 100 and a video camera body 200 are electrically connected with each other through contacts a1 to g1 and through contacts a2 to g2 and optically connected with each other.

Within the interchangeable lens 100 are disposed a focusing lens 101, a magnification adjusting lens 102, an exposure adjusting iris 103, driving circuits 104, 105 and 106 for respectively driving the focusing lens 101, the magnification adjusting lens 102 and the exposure adjusting iris 103, an optical correcting system 1 and 2, an automatic stabilizer control circuit 107, a locking control circuit 108 for controlling a locking means (not shown in FIG. 4 but described later) for locking and unlocking the optical correction means, and a lens microcomputer 109 for performing communications with the video camera body 200 and for performing control of the above-described circuits.

Within the video camera body 200 are disposed an imaging device 201 having an image sensor on which an image of an object P is incident through the optical lens 100, a video tape recorder 202 for recording a video signal from the imaging device 201, a control signal generating circuit 203 for generating an adjusting signal to adjust the focusing lens 101 and the exposure adjusting iris 103 and an automatic white balance (AWB) adjusting signal to adjust the balance of a color signal and thereby reproduce the white color correctly, a key input operating portion 204 used for various key input operations, such as a zooming operation, a power device 205 for converting the power from a battery 207 such that it can be used in the interchangeable lens 100 and for supplying that power, and a camera microcomputer 206 for performing control of the video camera.

Figure 1:
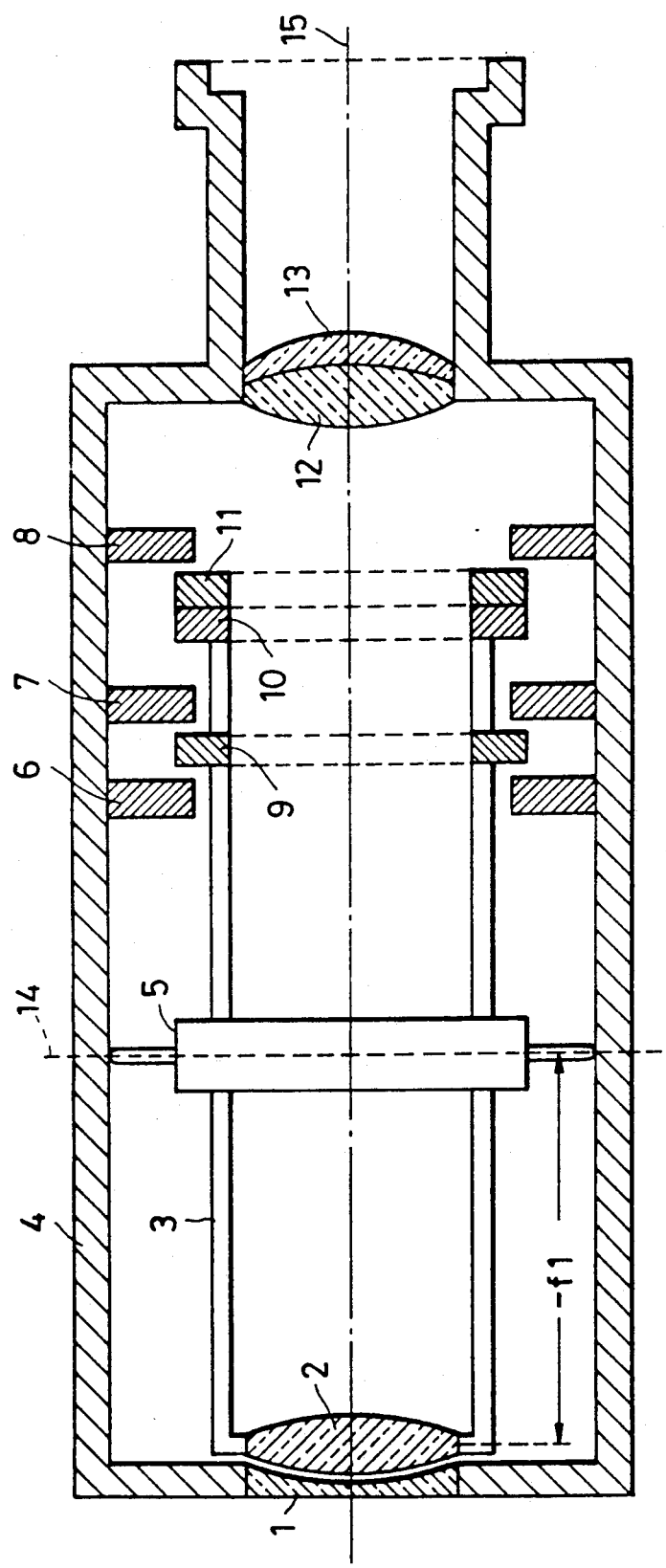
FIG. 1 is a cross-sectional view of a conventional image blur preventing device.
Figure 2:
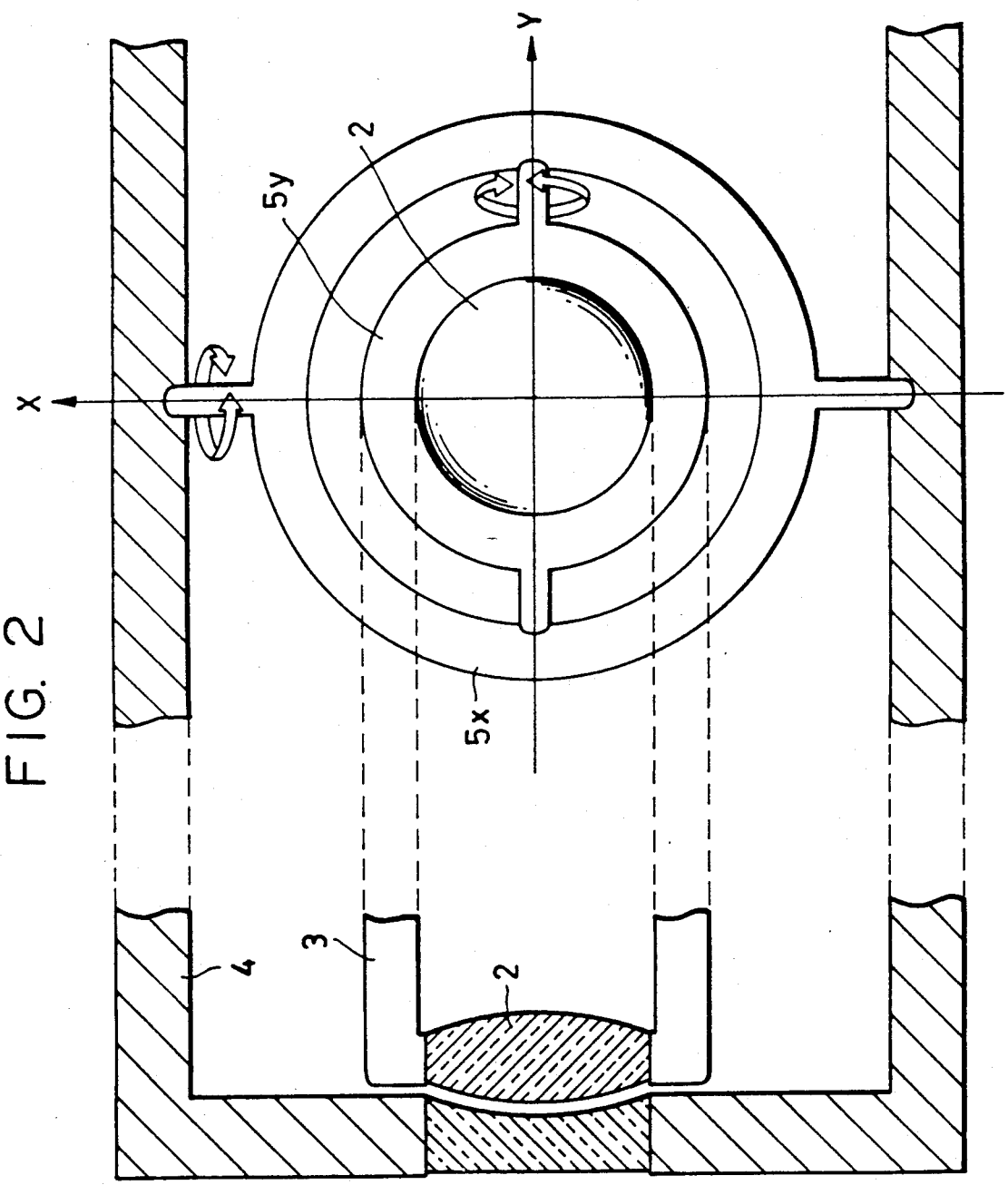
FIG. 2 is an enlarged view showing a gimbal support shown in FIG. 1.
Figure 3:
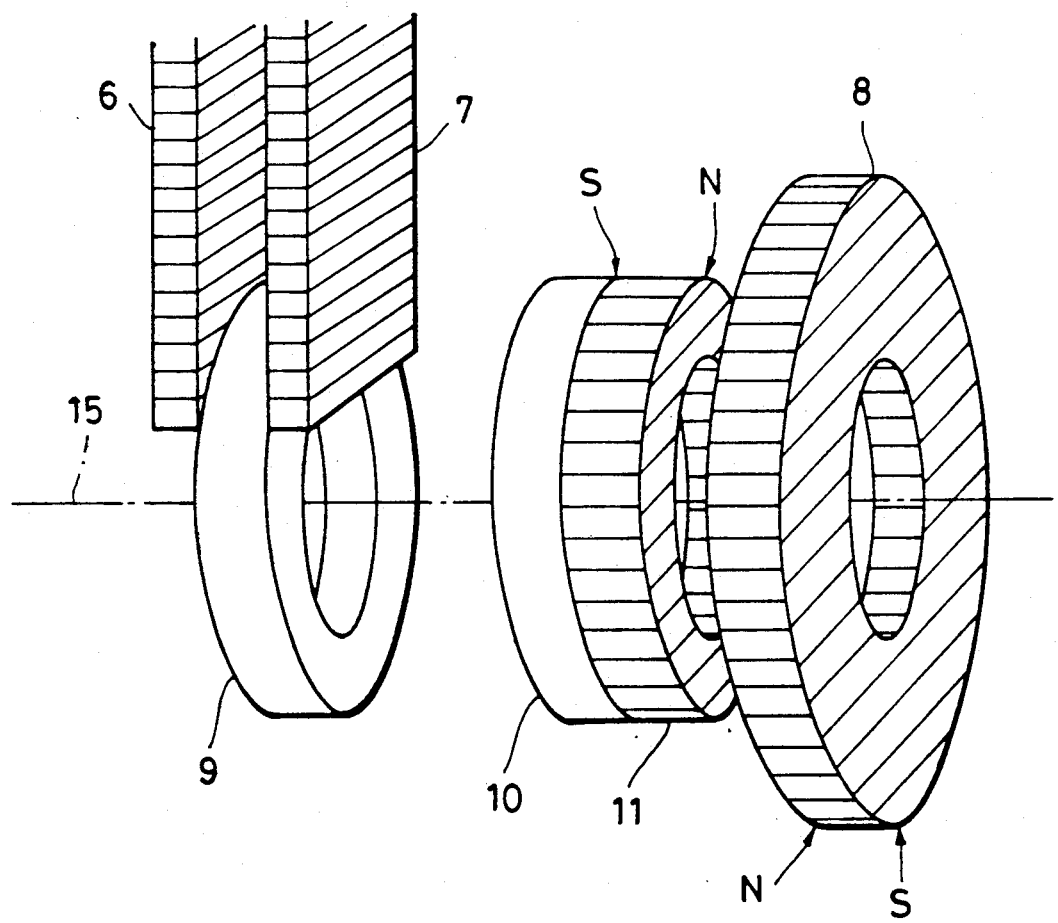
FIG. 3 is an enlarged view showing part of the configuration shown in FIG. 1.

FIGS. 6 to 13 show the optical correcting system 1 and 2, the stabilizer control circuit 107 (hereinafter, the optical correcting system 1 and the stabilizer control circuit 107, in combination, being referred to as an image blur prevention means), the locking means, the locking control circuit 108 and the stabilization operation conducted by the lens microcomputer 109. The image blur prevention means is of the inertia pendulum type, like the image blur preventing device shown in FIG. 1. The same reference numerals are used to denote components which are the same throughout the figures.

Figure 6:
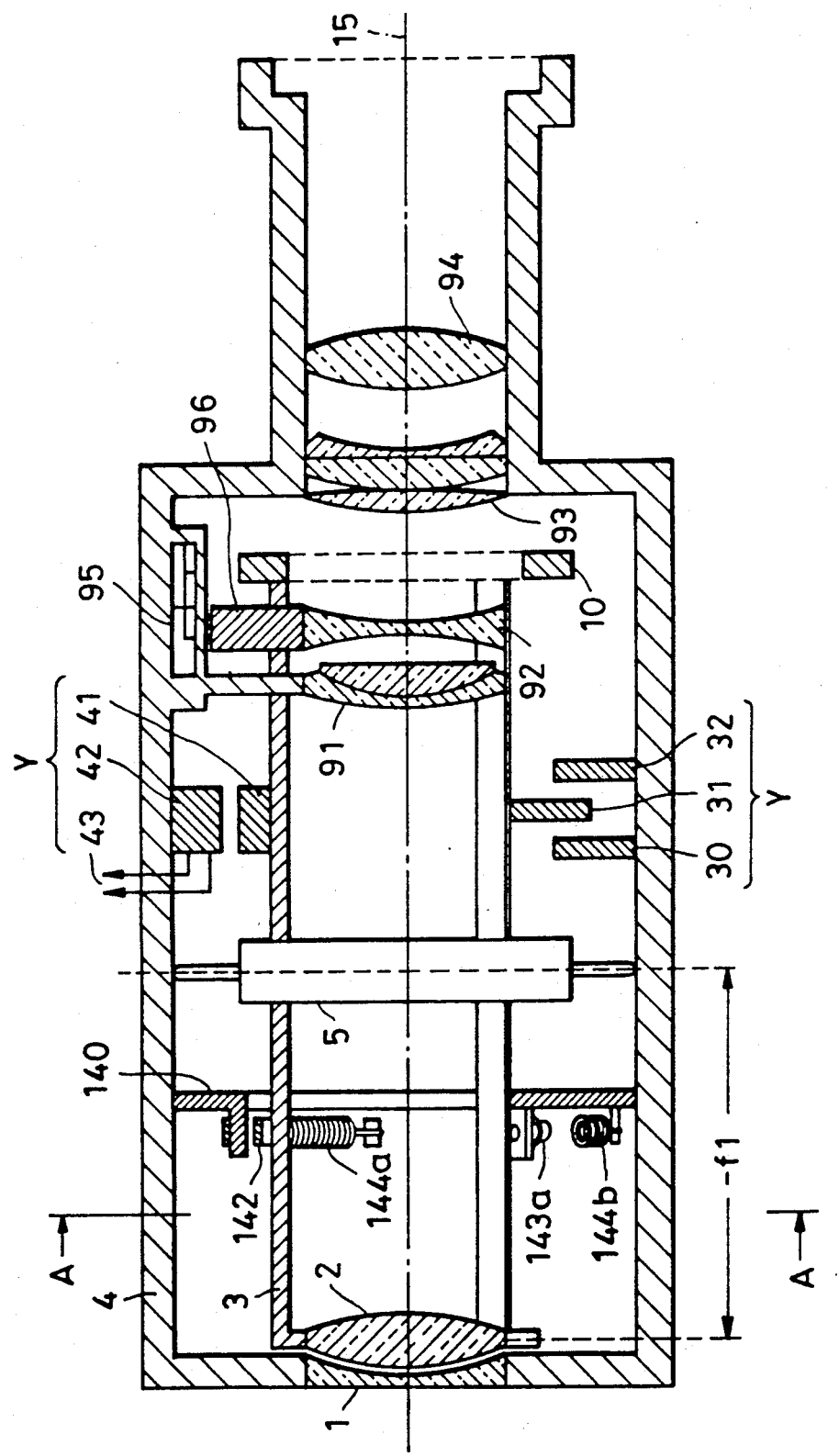
FIG. 6 is a cross-sectional view of an image blur preventing device of the embodiment shown in FIG. 4.

In FIG. 6, a main photographing optical system includes a front lens 91, a magnification changing lens 92 and image forming fixed lenses 93 and 94. The magnification changing lens 92 is provided in such a manner as to be movable by means of a movable ring 96 in order to achieve a change in the focal length. The movement of the magnification changing lens 92 is detected by a magnification changing encoder (hereinafter referred to as an ENC) 95. It is therefore possible to know the focal length of the photographing optical system from the output of the ENC 95. The ENC 95 shown in FIG. 6 is of the optical reflection type which produces a 2-bit signal.

Figure 7:
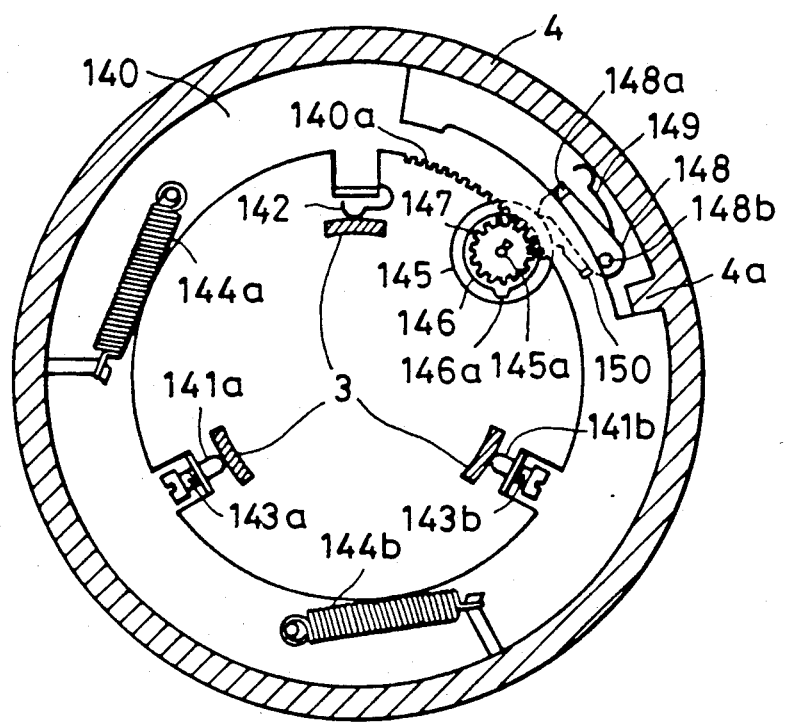
FIGS. 7 and 8 are sectional views taken along the line A—A of FIG. 6.
Figure 8:
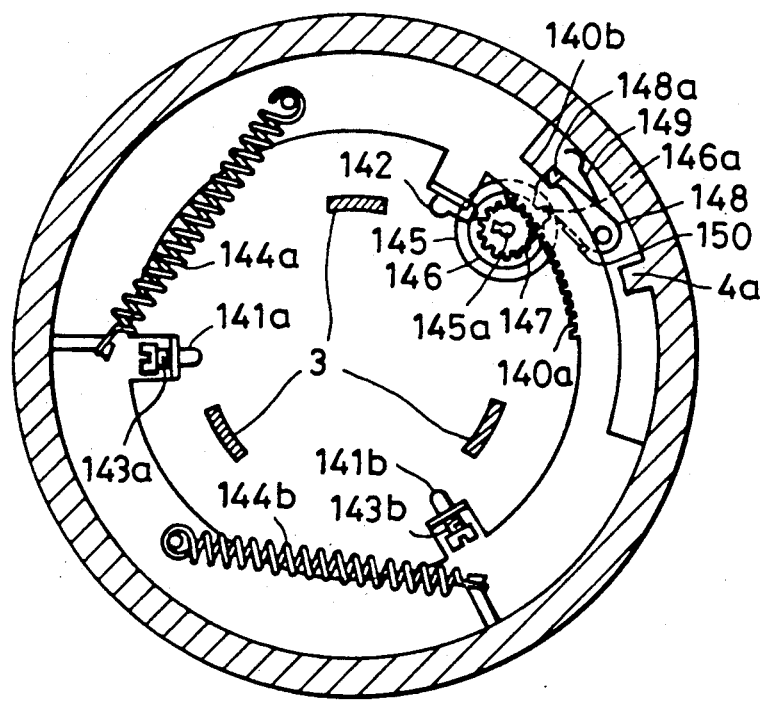
Figure 9:
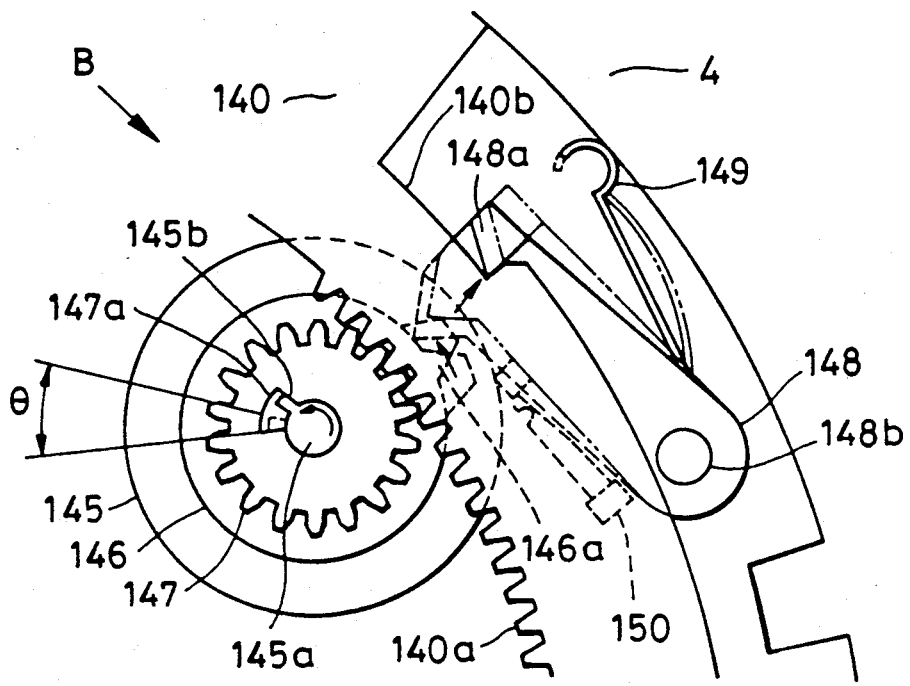
FIG. 9 is an enlarged view of the main portion of FIG. 8.
Figure 10:
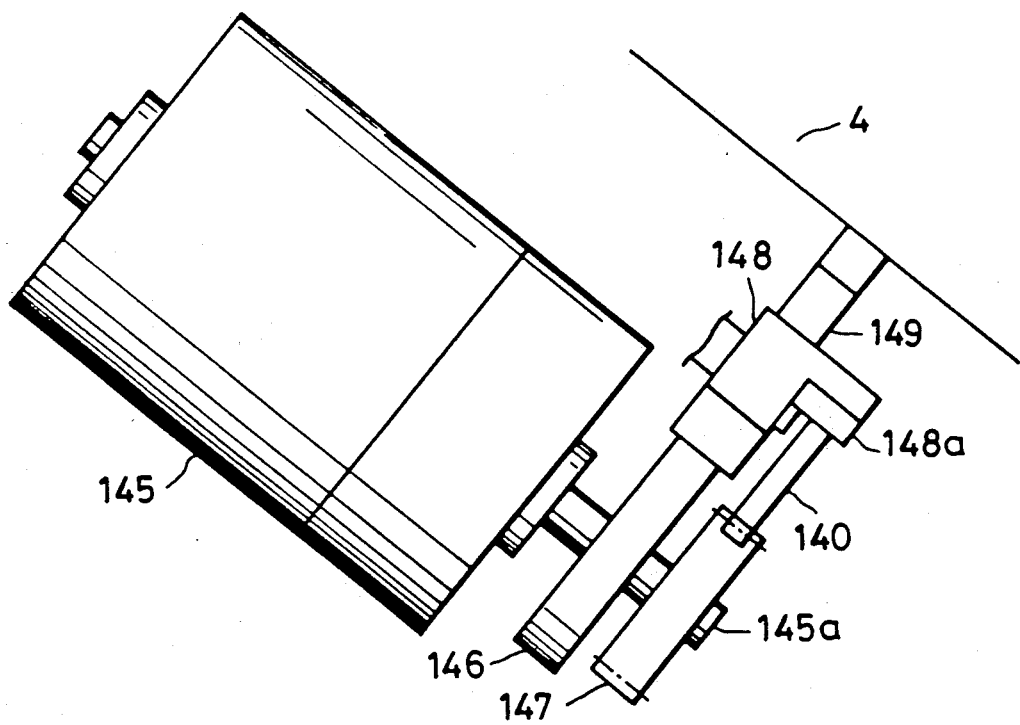
FIG. 10 is a view as seen when looking in a direction indicated by an arrow B in FIG. 9.

In FIGS. 7 and 8 (which corresponds to the section taken along the line A—A in FIG. 6) and FIGS. 9 and 10 (FIG. 10 being a view as seen when looking in the direction indicated by an arrow B in FIG. 9), a reference numeral 140 denotes a rotating member for temporarily locking the movable supporting member 3 relative to the barrel 4, the rotating member 140 having a gear 140a; pins 141a and 141b for determining the locked position of the movable supporting member 3, each of the pins 141a and 141b being a screw having a spherical distal end and urged by a spring 143a or 143b; a plate spring 142 for urging the movable supporting member 3 to a position determined by the pins 141a and 141b, the locked position of the movable supporting member 3 adjustable by rotating the pins 141a and 141b so as to improve the optical performance during locking; tension coil springs 144a and 144b for urging the rotating member 140 counterclockwise relative to the barrel 4, the rotating member 140 being in contact with a stopper 4a for locking of the movable supporting member 3; a motor 145 for rotating the rotating member 140; a disk 146 having a protrusion 146a on the outer periphery thereof and fixed to an output shaft 145a of the motor; a gear 147 in mesh with the gear 140a and coupled to the output shaft 145a of the motor 145 in such a manner that it can rotate through a limited angle; a rocking member 148 for stopping the rotating member 140 at an unlocked position of the movable supporting member 3; a plate spring 149 for urging the locking member 148; and a manual locking switch (MLSW) 150 turned on or off by the movement of the locking member 148 for generating a state signal indicative of the locked or unlocked state (the manual locking switch being turned on when the movable supporting member 3 is unlocked).

Referring again to FIG. 6, a sensor system (30, 31, 32) and a torque generator system (41, 42, 43) are respectively disposed on the inner wall of the barrel 4 and on the movable supporting member 3 in a symmetrical fashion with respect to the axis. The x and y axes are similar to each other, and the x axis is perpendicular to the y axis.

Figure 11:
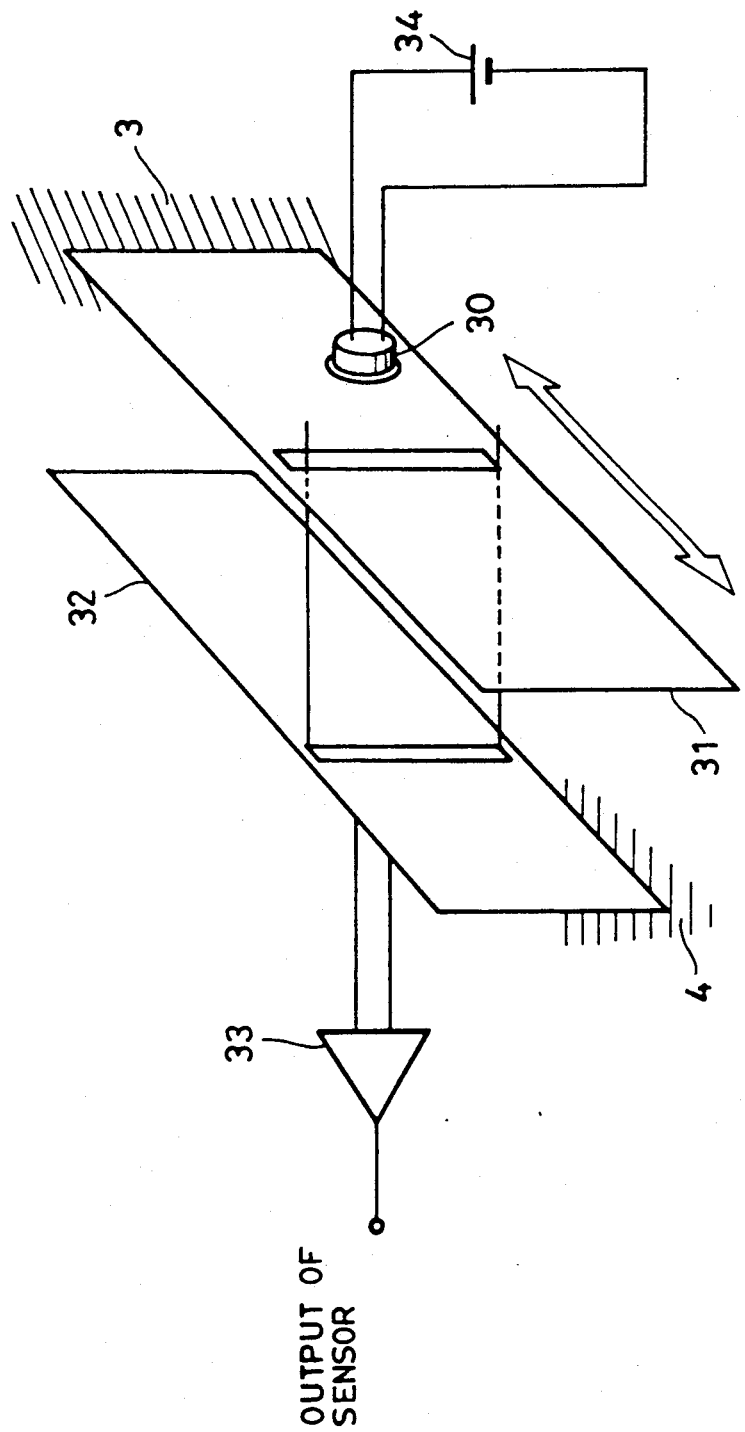
FIG. 11 is a perspective view showing the practical configuration of a sensor system shown in FIG. 6.

FIG. 11 shows the configuration of the sensor system. This system includes a light-emitting device 30, such as an LED, mounted on the inner wall of the barrel 4, a power source 34 for the light-emitting device 30, a one-dimensional light receiving position detecting device 32, and a slit curtain 31 mounted on the movable supporting member 3.

The slit curtain 31 which is disposed between the light-emitting device 30 and the one-dimensional light-receiving position detecting device 32 moves in the direction indicated by arrows that the movable supporting member 3 moves. A signal corresponding to the angle of deflection of the slit curtain 31 is detected by the light-receiving position detecting device 32, and the detected signal is output from a sensor amplifier 33 as the displacement signal of the movable supporting member 3 relative to the barrel 4.

Figure 12:
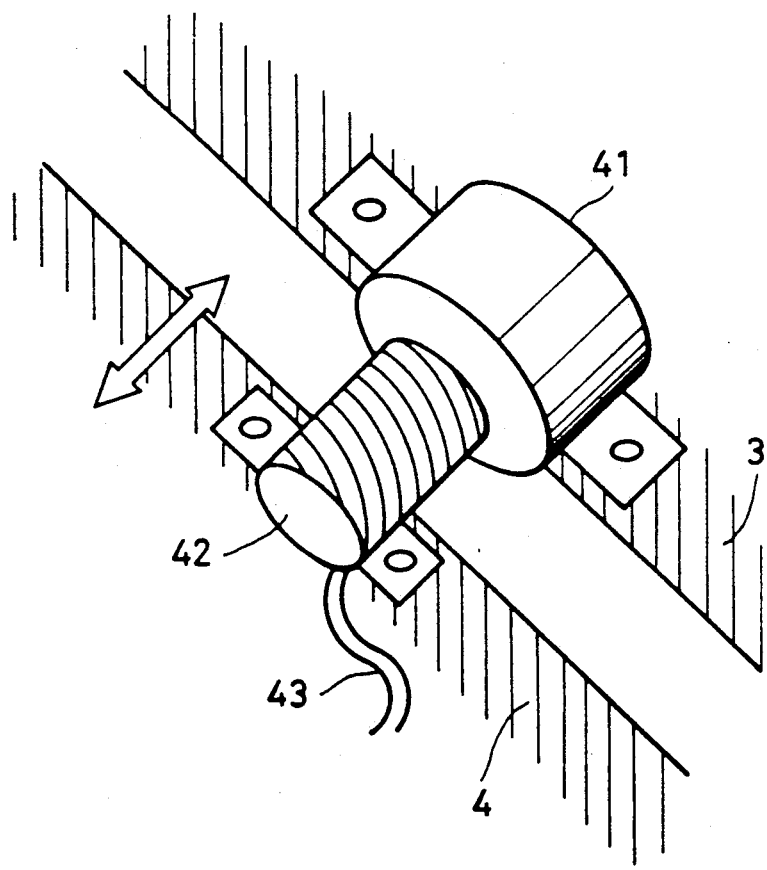
FIG. 12 is a perspective view showing the practical configuration of a torque generator system shown in FIG. 6.

FIG. 12 shows an example of the torque generator system which employs a voice coil. This system includes a voice coil mounted on the inner wall of the barrel 4, and a magnet 41 mounted on the movable supporting member 3.

As a control signal is input to an input terminal 43, a magnetic attracting force (or magnetic repelling force) is generated between the voice coil 42 and the magnet 41 in accordance with the amount of current of and the polarity of the control signal, thus generating a torque in the direction indicated by arrows in FIG. 12.

As stated above, the sensor system (30, 31, 32) and the torque generator system (41 and 42) are disposed such that the x and y axes are perpendicular to each other, so that they, together with the gimbal, can pivot the movable supporting member 3 about the x and y axes so as to achieve damping of the movement and centering of the movable supporting member 3.

Figure 13:
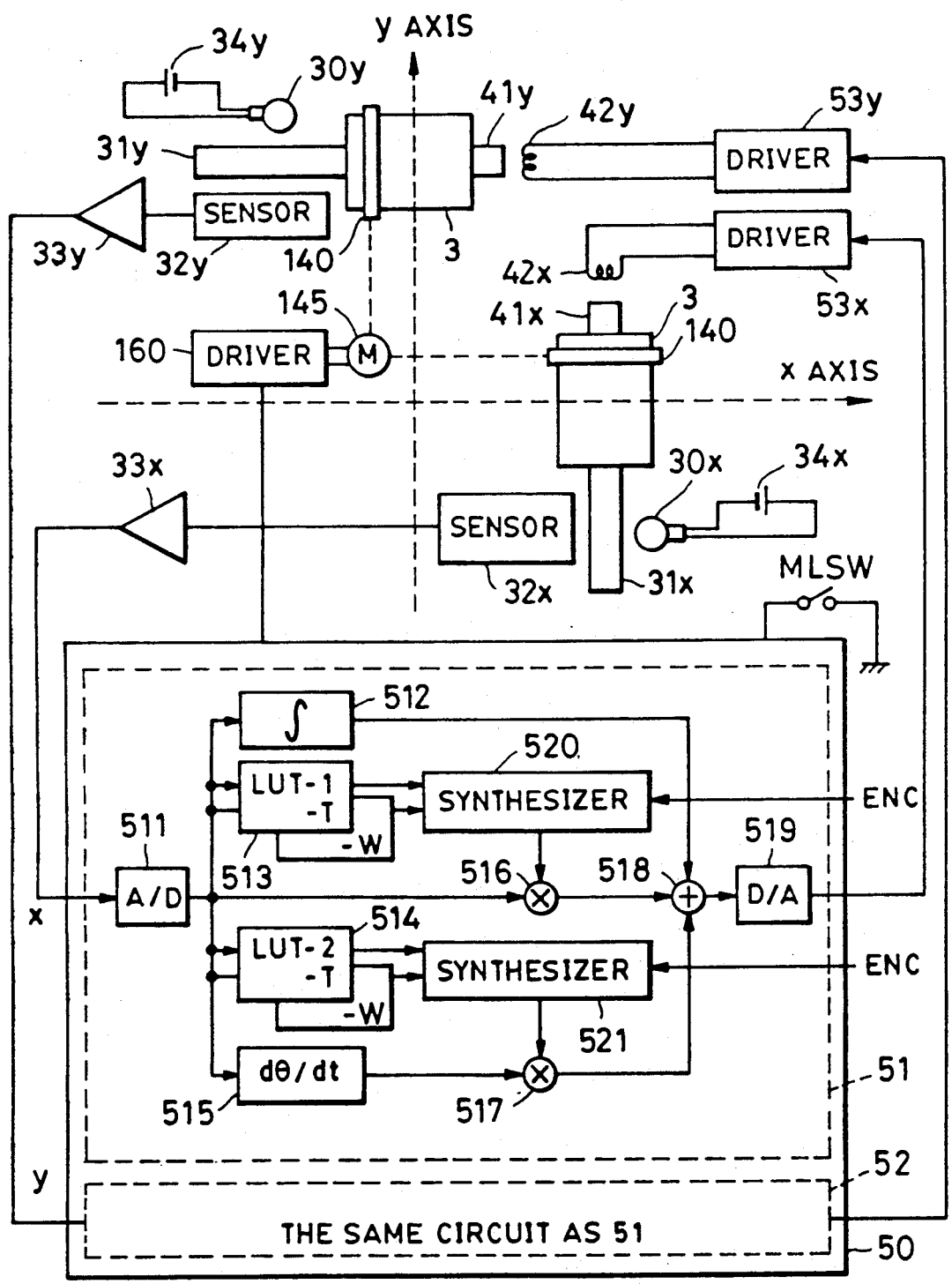
FIG. 13 is a block diagram of a control system according to the present invention.

FIG. 13 is a block diagram of a control system which receives the output of the sensor amplifier 33 and which controls the drive of the voice coil 42 in accordance with the displacement of the movable supporting member 3 relative to the barrel 4 so as to achieve torque control of the movable supporting member 3 about the x and y axes.

In FIG. 13, the sensor system for detecting pivoting of the movable supporting member 3 about the x axis includes sensors 30x, 31x, 32x, 33x and 34x, and the sensor system for detecting the pivoting of the movable supporting member 3 about the y axis includes sensors 30y, 31y, 32y, 33y, and 34y. The signal representing the displacement of the movable supporting member 3 about the x and y axes relative to the barrel 4, is output from the sensor amplifier 33 and then converted into a digital signal by an A/D converter 511 in a control circuit 50 before being output to the subsequent circuits.

The thus-obtained digital signal is processed in the manner described below, converted into an analog signal by a D/A converter 519, and then is output from the control circuit 50. The torque generator system 41 and 42 (in FIG. 13, the torque generator system for pivoting the movable supporting member 3 about the x axis is indicated by 41x and 42x, and that for pivoting the movable supporting member 3 about the y axis is indicated by 41y and 42y) is driven by driving circuits 53x and 53y on the basis of this analog signal.

In order to achieve both automatic stabilization and prevention of excessive movement of the lens portion while panning or tilting, the control circuit 50 generates non-linear control torque in the torque generator system 41x, 42x and 41y and 41y to damp the displacement of the movable supporting member 3 which is the inertia pendulum relative to the barrel 4 and to center the displaced movable supporting member 3.

Figure 14:
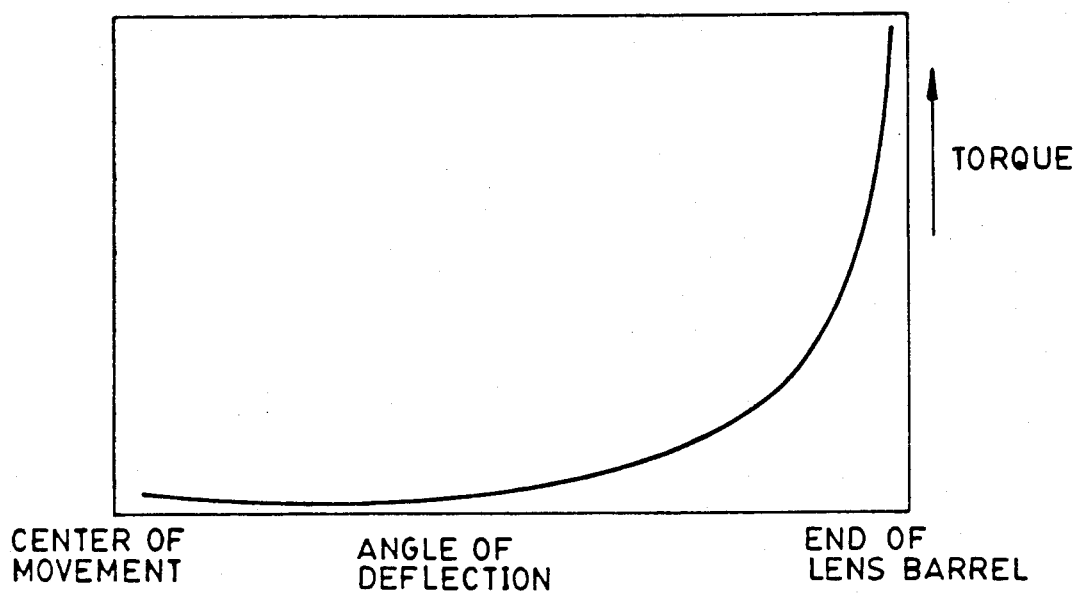
FIG. 14 shows the characteristics of the control torque which are the basic concept of the control system of FIG. 13.

FIG. 14 shows the characteristics of this control torque.

According to the characteristics of the control torque shown in FIG. 14, when the movable supporting member 3 is located in the vicinity of the center of movement, torque is not substantially generated in the torque generator system 41x, 42x and 41y and 42y so that the stabilization action caused by the inertia pendulum cannot be hindered by the generated torque.

On the contrary, when panning, i.e., moving the barrel 4 in a horizontal direction in order to change the composition of the object being viewed or tilting, i.e., moving the barrel 4 in a vertical direction in order to change the composition of the object being viewed is conducted by moving the barrel 4 extensively in one direction, that is, when the movable supporting member 3 is moved away extensively from the center of movement by the action of the inertia pendulum, the control circuit 50 generates a rapidly increasing centering or damping force in the torque generator system 41x, 42x and 41y and 42y so as to return the movable supporting member 3 to the center of movement, and thereby prevents collision of the movable supporting member 3 against the inner wall of the barrel 4. The amount of generated torque rapidly increases as the amount of displacement increases.

Figure 15:
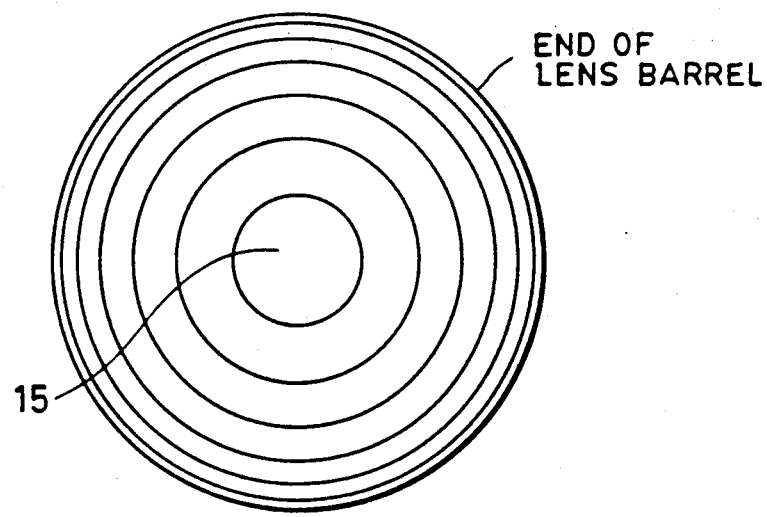
FIG. 15 shows an image as seen when looking the characteristics of the control torque shown in FIG. 14 in a direction of a main optical axis.

FIG. 15 shows an image of the torque curve shown in FIG. 14 as seen when looking in the direction of the main optical axis 15 of the pendulum. In FIG. 15, a single concentric circle indicates a change in the torque by a fixed amount. The intervals between the adjacent concentric circles decrease toward the outer periphery, i.e., toward the end of the barrel 4. This indicates that the gradient of the torque characteristics increases rapidly as the amount of displacement of the movable supporting member 3 from the center of movement increases, that is, the torque curve rises non-linearly, as shown in FIG. 14.

Thus, when the movable supporting member 3 has been moved close to the barrel 4, the centering and damping forces are generated extensively and collision of the movable supporting member 3 against the barrel 4 is thereby prevented. In other cases, the centering and damping action is reduced as much as possible so that the stabilization action caused by the inertia pendulum is not hindered by the centering and damping action.

In order to achieve the control characteristics shown in FIG. 14, the control circuit 50 selects from look up tables (hereinafter referred to as LUTs) 516 and 517 stored in the memory in the control circuit 50 coefficients K1 and K2 which assure the torque curve shown in FIG. 14 in accordance with the amount of displacement (the angle of deflection $\theta$) of the movable supporting member 3 which is input from the sensor amplifiers 33x and 33y, operates the control function by the following equation $$DATA = K1 * \theta + K2 * d\theta/dt + K3 * \int dt$$

(where the coefficient K3 is a fixed small value, and * indicates multiplication), and then generates the control torque represented by DATA in the torque generator system 41x, 42x, 41y and 42y.

In the control function, the term "K1 * $\theta$", obtained by the combination of the LUT 513, a synthesizer 520 and a multiplier 516, acts as a spring for generating a centering force in accordance with the amount of displacement of the movable supporting member 3 from the center of movement. The term "K2 * d θ/ d t", obtained by the combination of the LUT 514, a differentiator 515, a synthesizer 521, and a multiplier 517, has the effect of damping the movement of the movable supporting member 3 during panning or tilting. The term, "K3 * ∫θd t", obtained by an integrator 512, serves to cancel various types of errors, such as accumulated errors or manufacturing errors, and thus returns the movable supporting member 3 to the center of movement. The integration operation is such that it affects the control system less than the other terms. Therefore, non-linear processing is not conducted on the integration, unlike the other terms.

An adder 518 adds up the respective terms, and the D/A converter 519 converts the output of the adder 518 into an analog signal and supplies this analog signal to the torque generator 42x and 42y through the driving circuits 53x and 53y.

The control circuit 50 also controls locking and unlocking of the movable supporting member 3 through the locking control circuit 108 (locking and unlocking being conducted through a driving circuit 160 by means of the motor 145).

In the control circuit 50 shown in FIG. 13, as the configuration of the portion enclosed by a broken line 51 and that enclosed by a broken line 52 are the same except for the coefficient data in the LUTs 513 and 514. Accordingly, the details of the box indicated by the broken line 52 are not shown to simplify the description. Furthermore, the portion between the integrator 512 and the adder 518 in the portion enclosed by the broken line 51 shows the processing operation of the control circuit 50 in a hardware fashion.

Figure 16:
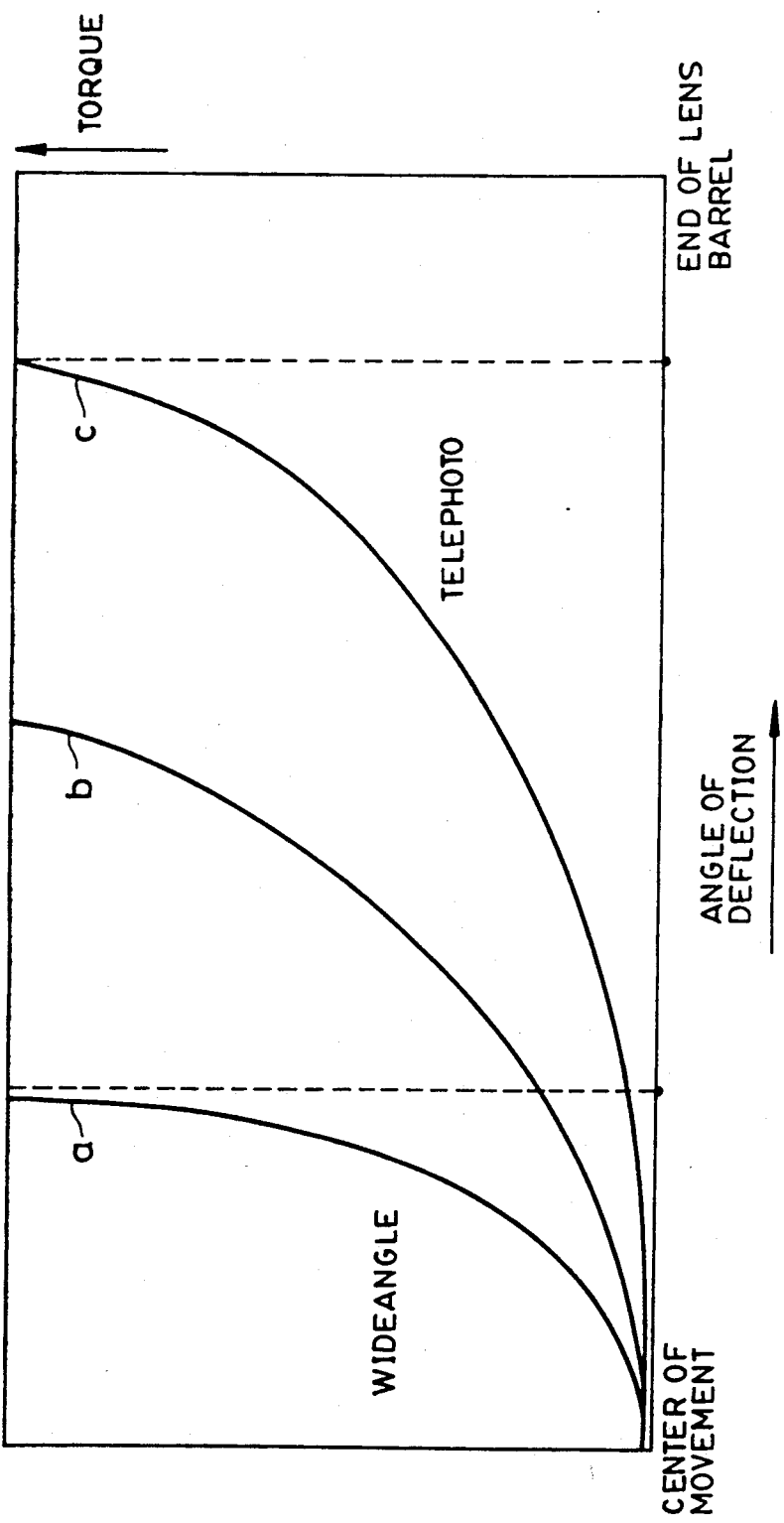
FIG. 16 shows the characteristics of the control torque when they are changed in accordance with a focal length in the stabilization operation conducted in the embodiment of the present invention.

In this embodiment, the amount of control torque applied changes in accordance with the output of the magnification changing encoder (ENC 95), that is, the amount of control torque applied at the wide angle end is larger than that applied at the telephoto end. This is shown in FIG. 16. As the focal length of the photographing optical system changes from the telephoto end (long focal length) to the wide angle end (short focal length), the non-linear control torque curve changes, as shown by (c)→(b)→(a), and the amount of torque applied at the same angle of deflection increases.

Hence, the LUTs 513 and 514 in the control circuit 50 store both the coefficients K1 and K2 for the control function corresponding to the angle of deflection θ of the movable supporting member 3, required to obtain the torque curve (a) at the wide angle end and the coefficients K1 and K2 for the control function corresponding to the angle of deflection θ of the movable supporting member, required to achieve the desired torque curve at the telephoto end. These coefficients are selected in accordance with the angle of deflection θ of the movable supporting member 3, and a synthesizing operation is then conducted on the selected coefficients such that any of the aforementioned torque curves corresponding to the value of the ENC 95 can be achieved to obtain the coefficients K1 and K2 for the control function.

Generally, camera shake at the telephoto end is more noticeable than at the wide angle end. Therefore, the characteristics of the control torque which is the countermeasure for extensive movement of the barrel 4, such as panning, and which acts to reduce the stabilization effect, are changed in accordance with the conditions under which the optical apparatus is used. Stated differently, the characteristics of the control torque applied at the telephoto end are made weaker than those at the wide angle end so that efficient stabilization can be effected at the telephoto end.

In this way, the stabilizing optical system can be reduced in size and in weight without reducing the stabilization characteristics thereof in the vicinity of the telephoto end.

This will be discussed in more detail below.

Figure 17:
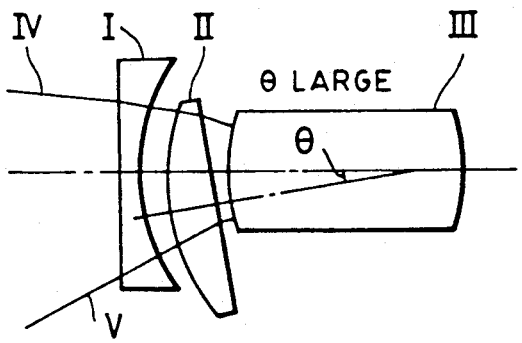
FIG. 17 explains a reduction in the size of the device shown in FIG. 6.
Figure 17:
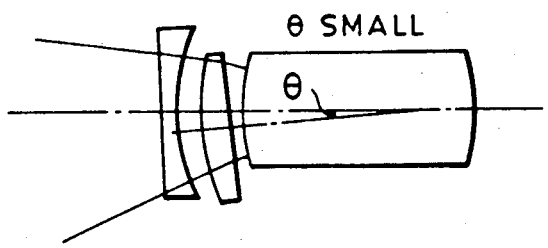

In FIG. 17, reference numerals I and II respectively denote a first lens group and a second lens group which form the correcting optical system and which are similar to the lenses 1 and 2 shown in FIG. 6. Reference numeral III denotes a main photographing system, and IV and V respectively denote non-axial light rays.

FIG. 17 (A) shows the state in which the second lens group is deflected extensively for stabilization, and FIG. 17 (B) shows the state in which the second lens group is deflected less.

The size of each lens element in the first and second lens groups is determined by the distance from the center of the optic axis at which the non-axial light rays IV and V pass through the lens systems.

Therefore, when the angle of deflection is small, the size of the optical system can be reduced because the distance from the center of the optic axis at which the non-axial light passes through the lens system is less than that when the angle of deflection is large, as shown in FIG. 17.

The non-axial light ray which determines the size of the optical system is generally that formed at the maximum image size at the wide angle end or in the zooming range near the wide angle end.

The angle of view in the vicinity of the telephoto end is small. Therefore, a sufficient stabilization range can be obtained by providing a certain angle of deflection in the vicinity of the wide angle end (image blur at the wide angle end is not so noticeable as that at the telephoto end).

Hence, when the range of deflection angle, i.e., the control range, for the stabilization operation in the vicinity of wide angle end, is more narrow than that at the telephoto end according to the torque characteristics shown in FIG. 16, the stabilizing optical system can be reduced in size and in weight without reducing the stabilizing characteristics in the vicinity of the telephoto end (compare FIG. 17 (A) with 17 (B)).

The operation of the video camera system arranged in the manner described above will now be described with reference to FIG. 5.

"Step 1" "H" is assigned to the camera power (CP) flag.

"Step 2" It is determined whether the camera power is turned on. If the camera power is turned on, the process goes to step 3.

"Step 3" It is determined whether "H" has been assigned to the CP flag. If the answer is affirmative, the process goes to step 4. If the answer is no, the process goes to step 9.

"Step 4" The mode switch of all the automatic adjusting functions (AE, AF, AWB, AS, i.e., auto stabilizer, associated with the video camera body 200, is turned on.

"Step 5" Prior to the starting of the AS operation, the movable supporting member 3 which has been locked by the locking means, as shown in FIG. 7, is unlocked.

This unlocking command is transmitted from the camera microcomputer 206 incorporated in the video camera body 200 to the lens microcomputer 109 in the form of digital data (CTL Camera To Lens).

"Step 6" When the lens microcomputer receives the data, it gives an unlocking instruction to the locking control circuit 108.

This unlocking operation will be described below with reference to FIGS. 7, 8, 9. 10 and 13. First, the motor 145 is rotated clockwise through the driving circuit 160. Consequently, the rotating member 140 starts rotating clockwise from the state shown in FIG. 7 while elongating the coil springs 144a and 144b, and the movable supporting member 3 is thus unlocked. Once a claw portion 148a of the locking member 148 comes into engagement with a recessed portion 140b of the rotating member 140, the MLSW 150 is turned on, by which the drive of the motor 145 is stopped and the unlocking operation is thereby completed and the state shown in FIG. 8 is attained.

"Step 7" It is determined by the detection of turning on of the MLSW 150 that the unlocking operation has been completed. Completion of the unlocking operation is transmitted from the lens microcomputer 109 to the camera microcomputer 206 in the form of digital data.

"Step 8" A stabilization operation is then started.

Figure 19:
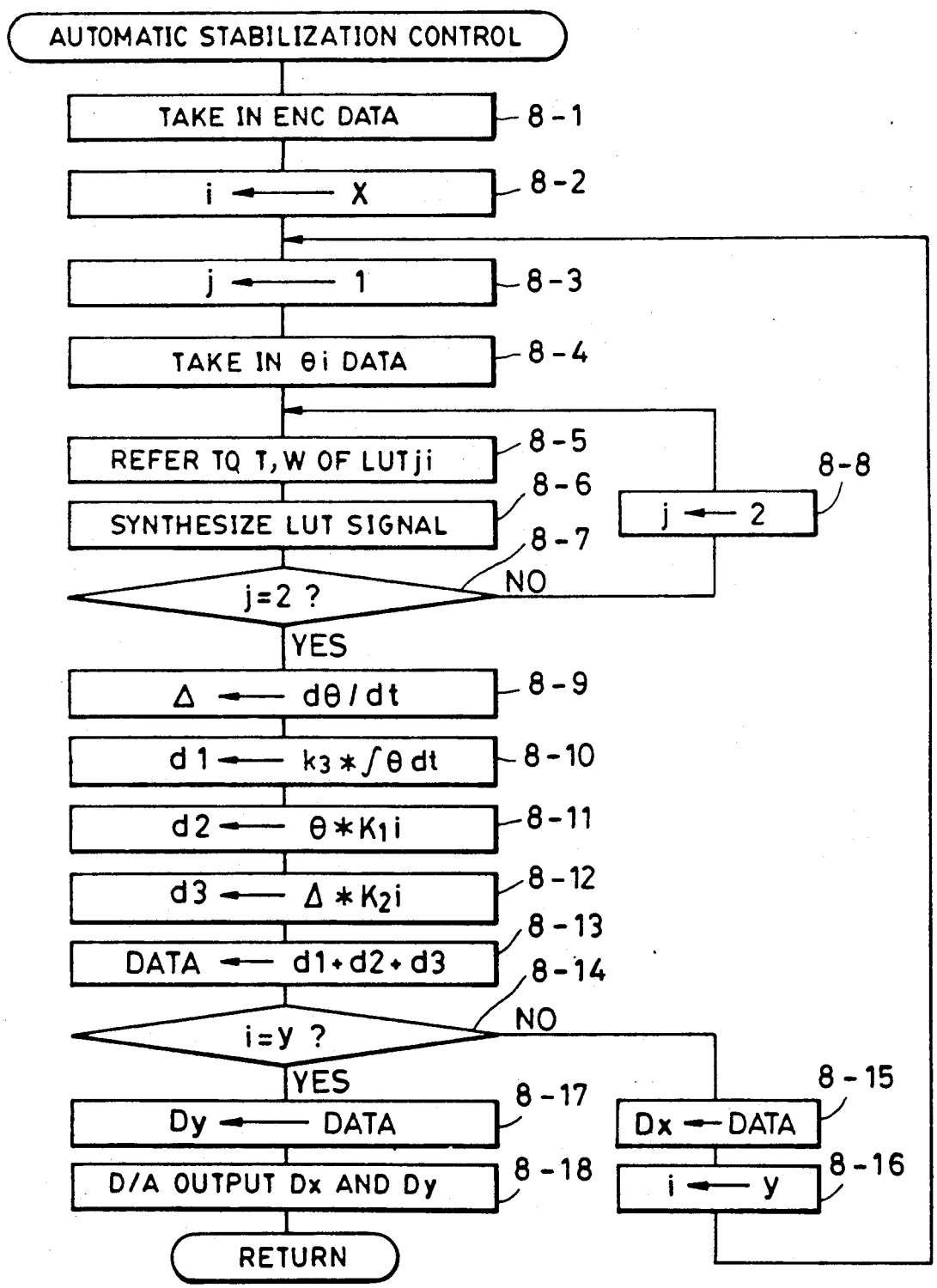
FIG. 19 is a flowchart showing the stabilization operation conducted in an embodiment of the present invention.

The operation of the control system shown in FIG. 13 when the stabilization operation is conducted will be described below with reference to FIG. 19.

"Step 8-1" The value (ENC data) of the ENC 95 is taken in for detection of the focal length.

"Step 8-2" "x" is assigned to the process mode i to operate the control torque signal which controls the pivot of the movable supporting member 3 about the x axis.

"Step 8-3" "1" is assigned to the LFT selection mode j so as to designate the coefficients for the control function, stored in the LUTs.

"Step 8-4" The output of the sensor amplifier 33, corresponding to the angle of deflection θ (hereinafter referred to as θx) of the movable supporting member 3 about the x axis, is taken in from the A/D converter 511 in the form of digital data.

"Step 8-5" The coefficients K1w and K1T, corresponding to the angle of deflection θx caused by pivot of the movable supporting member 3 about the x axis, are read out from the LUT-1x-W and LUT-1x-T for storing the coefficient K1 for the control function which ensures the control torque curves (a) and (c) shown in FIG. 16 at the wide angle end and at the telephoto end in accordance with the LUT selection mode setting made in step 8-3 in which "1" is assigned to the LUT selection mode j.

"Step 8-6" The coefficient K1 of the control function, corresponding to the present focal length, is obtained by synthesizing the coefficient K1w and K1T in accordance with the output of the ENC 95.

Figure 18:
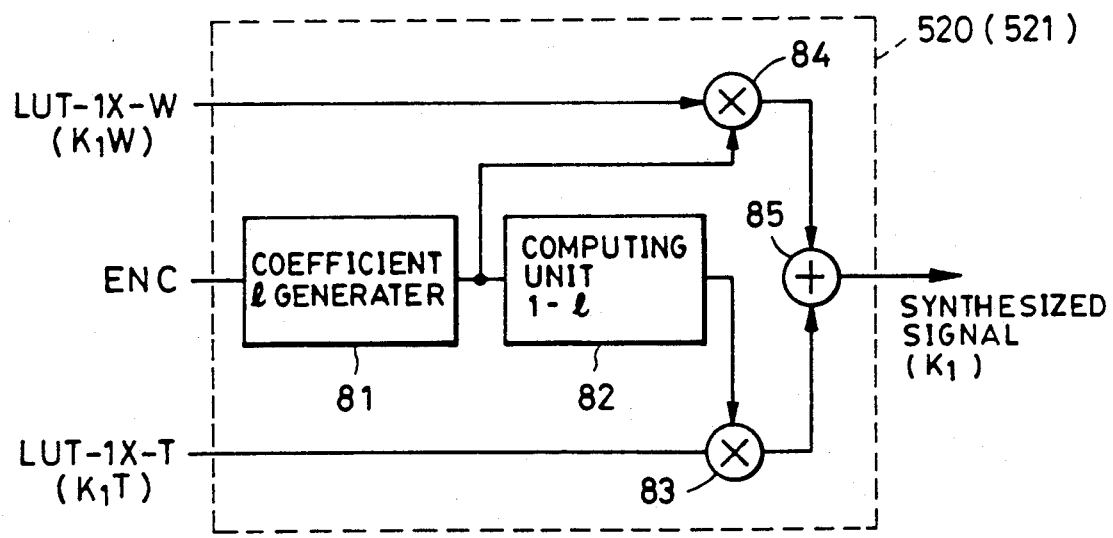
FIG. 18 is a circuit diagram showing the practical configuration of a synthesizer shown in FIG. 13.

FIG. 18 shows an example of this synthesizing operation in terms of hardware.

In FIG. 18, a synthesizer 520 (which is similar to a synthesizer 521) includes a coefficient generator 81 for generating a coefficient "", corresponding to the resolution of the ENC 95, an operator 82 for generating the complement of "1" (1−), multipliers 84 and 83 for operating "K1T * " and "K1w * (1−)", and an adder 85 for adding the outputs of the multipliers and for outputting the coefficient K1 corresponding to the focal length.

If LUTs constitute the same number as that of the number of steps (resolutions) of the ENC, synthesizer 520 or 521 is omitted.

"Step 8-7" It is determined whether or not the process for the LUT selection mode j="1" and the LUT selection mode j ="2" is completed. If the answer is no, the process goes to step 8-8.

"Step 8-8" "2" is assigned to the LUT selection mode j.

Thereafter, the process returns to step 8-5 and the coefficients K1w and K2T, corresponding to the angle of deflection θx caused by pivot of the movable supporting member 3 about the x axis, are read out from the LUT-2x-W and LUT-2x-T for storing the coefficient K2 for the control function which ensures the control torque curves (a) and (c) shown in FIG. 16 at the wide angle end and at the telephoto end in accordance with the LUT selection mode setting made in step 8-3 in which "2" is assigned to the LUT selection mode j. Thereafter, the coefficient K2 of the control function, corresponding to the present focal length, is obtained by the aforementioned synthesizing operation in step 8-7.

"Step 8-9" θx is differentiated with respect to time (dθx / dt) to obtain data Δ.

"Step 8-10" θx is integrated with respect to time (∫θx dt), and the resultant data is multiplied by the coefficient K3 to obtain data d1.

As stated above, a small fixed value is set as the coefficient K3 and non-linear process is not conducted on the set value, unlike the other coefficients K1 and K2, so as to reduce the degree of influence of the coefficient K3 on the control system.

"Step 8-11" The θx is multiplied by the coefficient K1 to obtain data d2.

"Step 8-12" The data Δ is multiplied by the coefficient K2 to obtain data d3.

"Step 8-13" The data d1, d2 and d3 are totalled, and the results are temporarily stored as "DATA".

That is, the control function is obtained here by DATA = d1 + d2 + d3

$$DATA = d1 + d2 + d3 = K_1 * \theta x + K_2 * d\theta x/dt + K_3 * \int \theta x dt$$

"Step 8-14" It is determined whether the present process mode i relates to the pivot of the movable supporting member 3 about the x axis.

If an odd number is assigned to the present process mode i, and it is determined that the process has been conducted an odd number of times, it is associated with the pivot about the x axis, i.e., the answer in step is no, and the process flow goes to step 8-15. If the process has been conducted an even number of times, it is associated with the pivot about y axis, i.e., the answer in step 8-14 is yes, and the process goes to step 8-17.

"Step 8-15" The results of the operation "DATA" are stored in Dx as the control torque data which controls the pivoting of the movable supporting member 3 about the x axis.

"Step 8-16" "y" is assigned to the process mode i, and then the process flow returns to step 8-3 to operate the control torque signal which controls the pivoting of the movable supporting member 3 about the y axis in the similar manner to that for the pivoting thereof about the x axis.

In this case, in step 8-5, the coefficients K1w and K1T, corresponding to the angle of deflection θy caused by the pivoting of the movable supporting member 3 about the y axis, are read out from the LUT-1y-W and LUT-1y-T for storing the coefficient K1 for the control function which ensures the control torque curves (a) and (c) shown in FIG. 16 at the wide angle end and at the telephoto end to counteract with the pivoting of the movable supporting member 3 about the y axis. At the same time, the coefficients K2w and K2T, corresponding to the angle of deflection θy, are read out from the LUT-2y-W and LUT-2y-T for storing the coefficient K2 for the control function which ensures the control torque curves (a) and (c) shown in FIG. 16 at the wide angle end and at the telephoto end. "Step 8-17" The results of the operation "DATA" are stored in Dy as the control torque data which controls the pivoting of the movable supporting member 3 about the y axis.

"Step 8-18" The control torque data Dx and Dy are converted into analog data by the D/A converter 519, and the converted data is output to the driving circuits 53x and 53y as the torque control signal so as to perform torque control on the pivoting of the movable supporting member 3 about the x and y axes.

Thus, as the movable supporting member 3 approaches the inner wall of the barrel 4 during a panning or tilting operation, a non-linearly increasing torque is generated in the torque generator system 41x and 42x for generating torque about the x axis and in the torque generator system 41y and 42y for generating torque about the y axis in accordance with the torque curve for the control function which ensures that the amount of torque increases as the focal length is changed from the telephoto end to the wide angle end, and the movable supporting member 3 is thereby returned toward the center of movement effectively.

Figure 5:
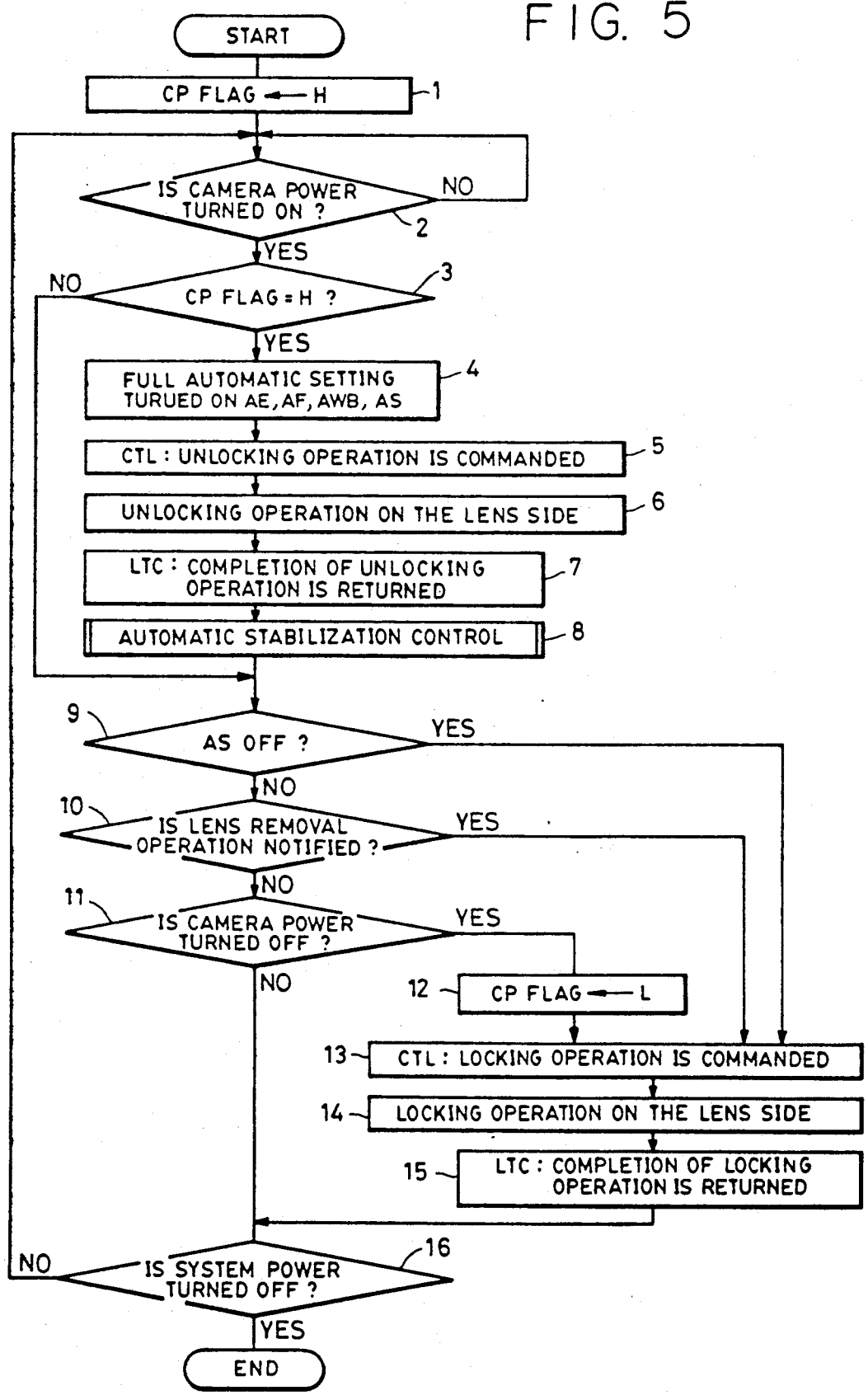
FIG. 5 is a flowchart showing the operation of the video camera of FIG. 4.

Thereafter, the process flow returns to step 9 in the main routine shown in FIG. 5.

"Step 9" It is determined whether the AS mode switch is turned off. If the AS mode switch is turned off, the process flow goes to step 13. If the AS mode switch is still on, the process flow goes to step 10.

"Step 10" It is determined whether removal of the interchangeable lens 100 from the video camera body 200 is notified from the key input operating portion 204. If notification has been made, the process flow goes to step 13. If notification is not made, the process proceeds to step 11.

"Step 11" It is determined whether the power to the camera operation circuit portion (this being used to distinguish the portion called the camera operation circuit portion from a VTR operation circuit portion) is turned off. If the power is still on, the process goes to step 16. If the power is turned off, the process goes to step 12.

"Step 12" As the camera power is turned off, "L" is assigned to the CP flag.

"Step 13" As the automatic stabilization operation has been suspended, locking of the movable supporting member 3 by the locking means is commanded, i.e., transfer to the state shown in FIG. 7 is commanded.

This command is transmitted in the form of digital data from the camera microcomputer 206 in the video camera body 200 to the lens microcomputer 109, as in the case of the unlocking command (CTL: Camera To Lens).

"Step 14" Upon receipt of the above data, the lens microcomputer 109 instructs the locking control circuit 108 to lock the movable supporting member 3.

This locking operation will now be described with reference to FIGS. 7 to 10. First, the motor 145 is rotated counterclockwise through the driving circuit 160. As the motor 145 is rotated counterclockwise, the gear 147 also rotates counterclockwise because a protrusion 145b provided on the output shaft 145a is in engagement with a groove portion 147a provided in the gear 147. However, since the protrusion 145b is in engagement with the groove portion 147a with an amount of play corresponding to an angle θ therebetween, as shown in FIG. 9, the output shaft 145a alone rotates counterclockwise through the angle θ from the unlocked state shown in FIG. 8. Rotation of the output shaft 145a rotates the disk 146 fixed thereto, and this rotation causes the protrusion 146a of the disk 146 to raise the locking member 148, disengaging the claw portion 148a from the groove 140b of the rotating member 140. Consequently, the rotating member 140 urged by the coil springs 144a and 144b rotates until it makes abutment with the stopper 4a, and is thus locked in the manner shown in FIG. 7.

"Step 15" Once it is determined by means of a timer or the like) that the locking operation has been completed, this is transmitted from the lens microcomputer 109 to the camera microcomputer 206 in the form of digital data (LTC: Lens To Camera).

"Step 16" It is determined whether the system power, including the VTR operation circuit, is turned off. If the system power is off, a series of the operations are completed. If the system power is on, the process flow returns to step 2, and the above-described processes are then repeated. If "L" is assigned to the CP flag in step 12, the process flow continues as the checking loop with the processes from step 4 to step 8 being bypassed until a subsequent mode change occurs.

According to the present embodiment, the image blur preventing device disposed on the interchangeable lens has the function of controlling the centering and damping torque such that centering and damping action is intensified when the movable supporting member 3 has moved close to the barrel 4 so as to prevent collision of the movable supporting member 3 against the inner wall of the barrel 4, and such that centering and damping action is reduced as much as possible so that the stabilization action caused by the inertia pendulum is not hindered by the centering and damping action. Consequently, in the photographing with the super telephoto end, image blur and unnatural movement of images can be lessened.

Now follows a discussion of a modification of the foregoing arrangement. In the above embodiment, when the removal of the interchangeable lens is detected, the camera microcomputer 204 commands the lens microcomputer 109 to lock the movable supporting member 3. However, in a case where a power source is provided on the interchangeable lens 100, the locking operation may be conducted when the lens microcomputer detects removal of the interchangeable lens 100 from the video camera body 200 from a change in the state of a mount locking pin or the like or from the cut-off of communications.

As will be understood from the foregoing description, according to the present invention, the operation of the driving means provided on the interchangeable lens for controlling the fixing means and that of the restricting means also provided on the interchangeable lens for restricting the relative displacement of the movable lens group to the fixed lens group is controlled in accordance with the operation mode of the camera through communications. It is therefore possible to improve the characteristics of the image blur prevention with an interchangeable lens having any focal length, to prevent unnatural movement of images during the panning or titling operation, and prevent breakage of the optical correcting means, which would occur when the stabilizing operation is not conducted.

What is claimed is:

1. A camera system having an image blur correcting function, comprising:
   a lens unit including:
   (a) a correcting optical system for correcting blur of images;
   (b) a position sensor for detecting a moving position of said correcting optical system;
   (c) a restricting means for generating a driving force for restricting a displacement of said correcting optical system on the basis of an output of said position sensor;
   (d) a fixing means for temporarily fixing said correcting optical system; and
   (e) a lens side communication means for exchanging data with a camera body; and
   (B) a camera body including:
   (a) a camera side communication means for exchanging data with said lens side communication means; and
   (b) an operation control means for outputting to said camera side communication means an operation control signal of controlling the operation of said restriction means and that of said fixing means in accordance with an operation mode of the camera.

2. The camera system according to claim 1, wherein said lens unit also includes a discrimination means for discriminating a connected state of said lens unit to said camera body, and a control means for controlling the operation of said fixing means when it is determined by said discrimination means that said lens unit is disconnected from said camera body.

3. The camera system according to claim 1, wherein said lens unit comprises a barrel and said correcting optical system comprises correcting lenses which are supported by a gimbal within a barrel of said lens unit in such a manner that it can pivot in directions of yaw and pitch.

4. The camera system according to claim 1, wherein said restriction means controls the operation characteristics of said correcting optical system in accordance with a focal length of said lens unit.

5. The camera system according to claim 1, wherein said fixing means fixes said correcting optical system by mechanically locking said correcting optical system.

6. The camera system according to claim 1, wherein said camera side communication means and said lens side communication means conduct data communications in two directions in a predetermined period.

7. The camera system according to claim 4, wherein the driving force generated by said restriction means for restricting the movement of said correcting optical system has a non-linear characteristic and increases as said correcting optical system approaches an inner wall of said lens unit.

8. A lens unit comprising:
   (a) a correcting optical system for correcting blur of images;
   (b) a position sensor for detecting a position of said correcting optical system;
   (c) a restriction means for generating a driving force of restricting a displacement of said correcting optical system on the basis of an output of said position sensor;
   (d) a fixing means for temporarily fixing said correcting optical system;
   (e) a communication means for exchanging data with a camera body; and
   (f) a control means for controlling said restriction means and said fixing means on the basis of data received from said camera by said communication means.

9. The lens unit according to claim 8, wherein said lens unit comprises a gimbal within said lens unit and said correcting optical means comprises correction lenses supported by said gimbal.

10. The lens unit according to claim 8, wherein said restriction means controls the operation characteristics of said correcting optical system in accordance with a focal length of said lens unit.

11. The camera system according to claim 10, wherein the driving force generated by said restriction means for restricting the movement of said correcting optical system has a non-linear characteristic and increases as said correcting optical system approaches an inner wall of said lens unit.

12. A camera for controlling a lens unit having a correcting optical system for correcting an image blur, and a locking means for locking said correcting optical system, comprising:
   (a) a communication means for conducting communications with said lens unit; and
   (b) a camera control means for operating a control signal which controls said correcting optical system and said locking means in said lens unit in accordance with an operation mode of said camera and for transmitting the results of the operation to said lens unit through said communication means.

13. The camera according to claim 12, wherein said control means locks said correcting optical system by operating said locking means when power is turned off.

* * * * *

UNITED STATES PATENT AND TRADEMARK OFFICE
CERTIFICATE OF CORRECTION

PATENT NO. : 5,117,246

DATED : May 26, 1992

INVENTOR(S) : Takahashi et al.

It is certified that error appears in the above-identified patent and that said Letters Patent is hereby corrected as shown below:

SHEET 4 OF THE DRAWINGS:

In Fig. 4, "GENERATER" should read --GENERATOR--;

SHEET 5 OF THE DRAWINGS:

In Fig. 5, "TURUED" should read --TURNED--; and

SHEET 14 OF THE DRAWINGS:

In Fig. 18, "$\ell$ GENERATER" should read --$\ell$ GENERATOR--.

COLUMN 1:

Line 28, "$f1=f2$" should read --$f1=-f2$--.

COLUMN 2:

Line 22, "oxes" should read --axes--.

COLUMN 5:

Line 11-13, "FIG. 15 shows an image as seen when looking the characteristics of the control torque shown in FIG. 14 in a direction of a main optical axis." should read --FIG. 15 shows an image of the torque curve shown in FIG. 14 as seen when looking in a direction of a main optical axis of the pendulum.--

UNITED STATES PATENT AND TRADEMARK OFFICE
CERTIFICATE OF CORRECTION

PATENT NO. : 5,117,246
DATED : May 26, 1992
INVENTOR(S) : Takahashi et al.

It is certified that error appears in the above-identified patent and that said Letters Patent is hereby corrected as shown below:

COLUMN 8:

Line 60, "DATA = K1 * θ + K2 * dθ/dt + K3 * ∫dt" should read

--DATA = K1 * θ + K2 * dθ/dt + K3 * ∫θd$\overline{t}$--.

COLUMN 9:

Line 25, "as" should be deleted; and
Line 29, "bos" should read --box--.

COLUMN 10:

Line 63, "lizer," should read --lizer)--.

COLUMN 11:

Line 4, "(CTL Camera" should read --(CTL: Camera--;
Line 46, "K1w" should read --K1W--;
Line 59, "coefficient K1w" should read --coefficients K1W--;
Line 65, "coefficient""," should read --coefficient "ℓ",--; and
Line 68, "K1w*(ℓ-)"," should read --K1W*(ℓ-)",--.

COLUMN 12:

Line 13, "K1w" should read --K2W--;
Line 41, "DA-" should be deleted;
Line 42 should be deleted; and
Line 54, "step" should read --step 8-14--.

UNITED STATES PATENT AND TRADEMARK OFFICE
CERTIFICATE OF CORRECTION

PATENT NO. : 5,117,246

DATED : May 26, 1992

INVENTOR(S) : Takahashi et al.

It is certified that error appears in the above-identified patent and that said Letters Patent is hereby corrected as shown below:

COLUMN 13:

Line 1, "K1w " should read --K1W--;
   Line 10, "K2w" should read --K2W--; and
   Line 15, "end. "Step" should read --end. ¶ "Step--.

COLUMN 14:

Line 28, "determined by" should read --determined
  (by--.

COLUMN 15:

Line 19, "a" should read --(A) a--.

COLUMN 16:

Line 32, "unitand" should read --unit and--; and
   Line 39, "camera system" should read --lens unit--.

Signed and Sealed this

Twenty-first Day of September, 1993

Attest:

BRUCE LEHMAN

*Attesting Officer*      *Commissioner of Patents and Trademarks*